United States Patent [19]

McCartney, Jr. et al.

[11] 4,351,891

[45] Sep. 28, 1982

[54] LEAD-ACID STORAGE BATTERY PLATE AND METHOD OF MAKING SAME

[75] Inventors: Charles P. McCartney, Jr., Yorktown; Ellis G. Wheadon, Anderson, both of Ind.

[73] Assignee: General Motors Corporation, Detroit, Mich.

[21] Appl. No.: 250,412

[22] Filed: Apr. 2, 1981

[51] Int. Cl.³ ............................................. H01M 4/30
[52] U.S. Cl. .................................... 429/225; 429/241; 141/1.1
[58] Field of Search ............... 429/225, 226, 227, 228, 429/241, 242, 212, 213, 214, 215, 216, 217, 209

[56] References Cited

U.S. PATENT DOCUMENTS 625,566  5/1899  King ..................................... 429/209
717,416  12/1902  Kitsee ..................................... 429/66
1,403,394  1/1922  Drambourg .......................... 429/228
2,833,846  5/1958  Wheat ................................... 429/228

FOREIGN PATENT DOCUMENTS 60313  6/1924  Sweden ............................... 429/225

Primary Examiner—Donald L. Walton
Attorney, Agent, or Firm—Lawrence B. Plant

[57] ABSTRACT

A pasted Pb-acid storage battery plate having a plurality of dimples formed in the surface(s) of the plate in the center of the grid openings defined by the grid wires. A dimpling process relocates active material from the centers of the active material pellets to the sides thereof more proximate the surrounding grid wires with a consequent increase in surface area and active material utilization efficiency.

2 Claims, 4 Drawing Figures

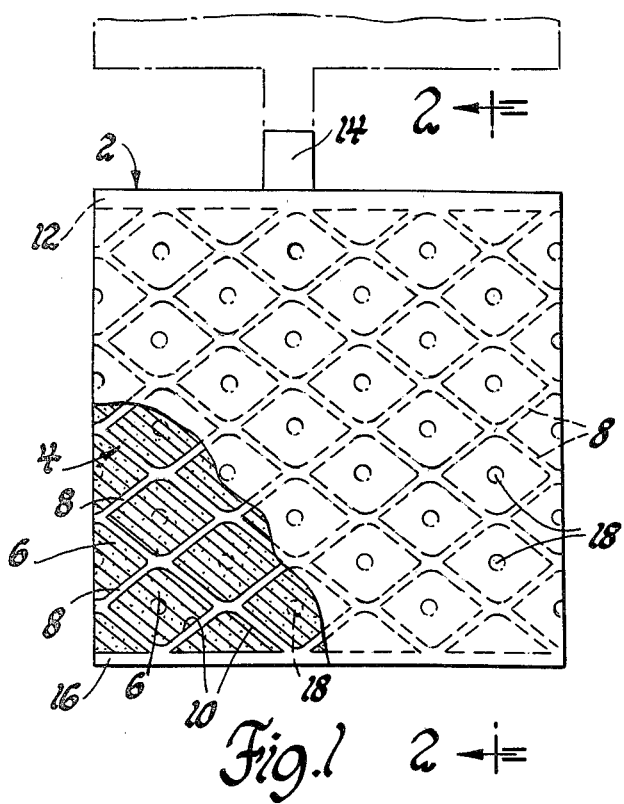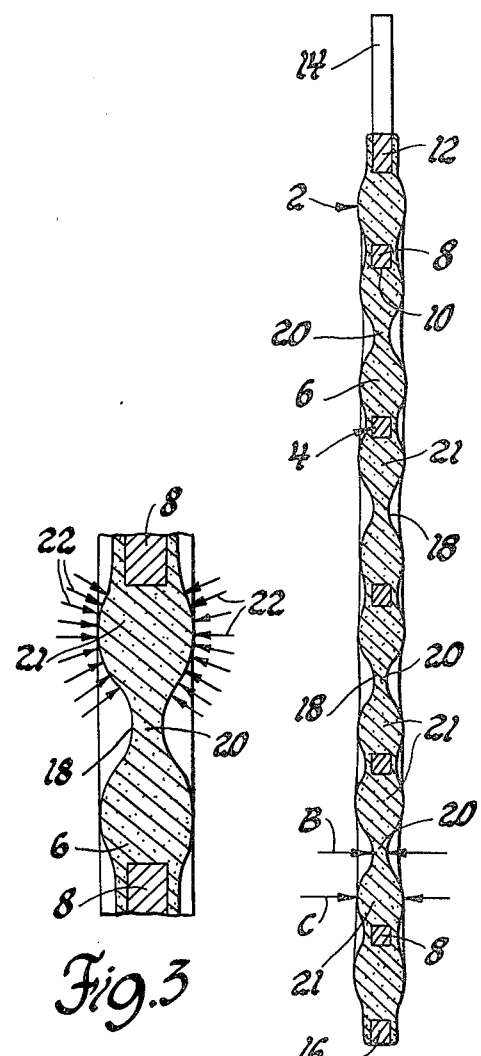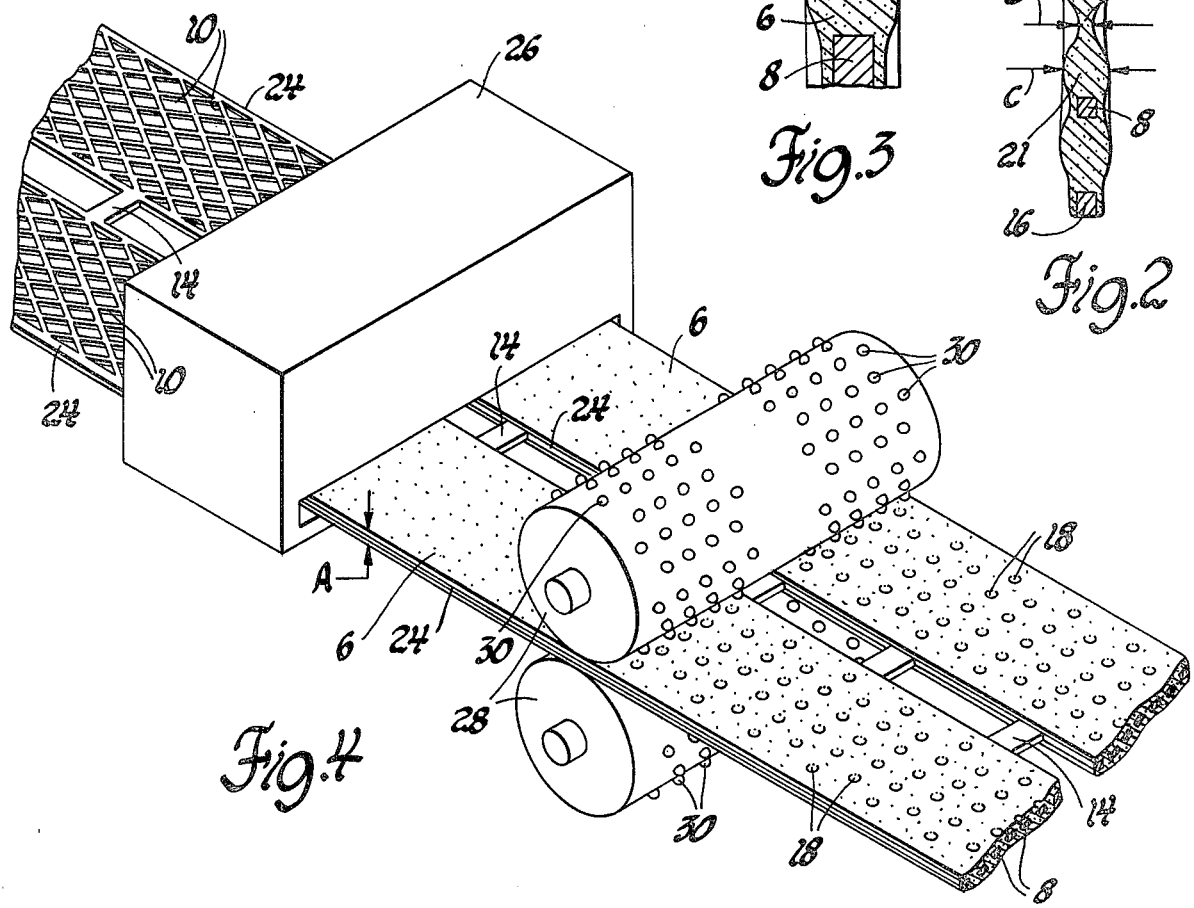

LEAD-ACID STORAGE BATTERY PLATE AND METHOD OF MAKING SAME

This invention relates to lead-acid storage battery plates and more particularly to plates wherein the active material is distributed thereacross so as to achieve improved active material utilization efficiency.

BACKGROUND OF THE INVENTION

Modern Pb-acid storage batteries utilize Faure-type electrode plates which comprise a conductive grid embedded in a leady active material. The plates are formed by pasting the grid with various proprietary mixes comprising principally PbO and then electrochemically converting the PbO to Pb and $PbO_2$ for the negative and positive electrodes respectively. The grid can take many forms depending on the manufacturer but generally comprises a network of criss-crossing interconnected grid wires depending from a current collecting upper border. The grid may or may not include other borders at its sides and bottom edges. The active material is retained in the grid primarily in the interstitial openings defined by the several grid wires making up the network.

A battery's capacity is usually rated by how many ampere hours it will deliver at a certain discharge rate before its terminal voltage falls below a predetermined value (i.e. the cutoff voltage). When the terminal voltage falls below this cutoff voltage, the battery is said to be completely discharged though, in fact, a considerable amount of unreacted active material remains in the plates. The ratio of the active material reacted to the amount of active material originally present is the utilization efficiency (often called "coefficient of use") of the active material. Typically, the remaining unreacted active material (i.e. on a total plate basis) exceeds the reacted material at the end of discharge. Hence utilization efficiencies of less than about 50% are common.

The active material utilization efficiency of a lead-acid battery plate actually varies across the face of the plate. The active material nearer the grid wires, for example, is utilized more efficiently than the active material in the center of the grid openings defined by the grid wires. This phenomenon is apparently due, at least in part, to the IR drop between the center of the opening and the surrounding grid wires.

Whatever the reason, it has been demonstrated that the active material at the center of the grid opening is less efficiently utilized than the active material proximate the grid wires. This excess of unreacted active material at the center of the opening merely contributes to the weight of the battery without providing any benefit in return.

It is an object of the present invention to provide a lead-acid storage battery plate having an active material distribution which contributes to a more efficient utilization of the active material and accordingly yields lighter weight plates having comparable capacity to uniformly thick plates of greater weight or same-weight plates having increased capacity. It is a further object of the present invention to provide such storage battery plates with increased surface area and improved electrolyte accessibility for improved voltage potential under load. It is a still further object of the present invention to provide a process for redistributing the active material on a previously pasted lead-acid storage battery plate to achieve the aforesaid improved utilization efficiency and voltage.

THE INVENTION

The present invention contemplates a nonuniform distribution of the leady active material (i.e. $Pb/PbO/PbO_2$) across the face of a lead-acid storage battery plate. The active material in the center of the grip openings and most remote from the grid wires is made much thinner than the active material proximate the grid wires. More specifically, the present invention comprehends a pasted lead-acid storage battery plate having a plurality of dimples on one or both faces thereof. The dimples are located at the center of the grid openings between the grid wires. Dimpling the plates produces four beneficial results. First, the active material is redistributed across the plate to zones where it can more efficiently be utilized (i.e. proximate the grid wires). Second, the overall surface area of the plate is increased by about 15% which improves the voltage potential of the plates under load. Thirdly, the dimples act as small reservoirs for the electrolyte at the surface of the plate for more effective access to the active material. Fourth, dimpling permits reducing the weight of a plate (e.g. by reducing the average thickness of the active material on the grid) without reducing the plates capacity. Tests have indicated that as much as seven percent (7%) of a plate's active material can be removed from the center of the grid opening without reducing the plates capacity. Accordingly a proportionately less amount of active material is needed for a dimpled plate than for a plate pasted to a uniform thickness, without surffering a loss in performance. By way of corollary, dimpling a "same-weight" plate provides increased capacity without a weight penalty.

Processwise, the grid is pasted in a conventional manner (e.g. belt pasted) to a uniform thickness and thereafter passed between coacting rollers having a plurality of bosses on the surfaces thereof. The bosses are so located on the rollers as to register with the center of the several grid openings and press the paste out of the center of the opening and relocate it closer to the surrounding grid wires where it can more efficiently be utilized. In a preferred embodiment, the plate is initially pasted thinner than it would otherwise be and then the bosses move the active material from the center of the opening to thicken the regions adjacent the grid wires. By so doing the total weight of the plate is reduced, the amount of the least reactive material at the center of the opening is minimized and the amount of the most reactive material adjacent the grid wires is maximized.

DETAILED DESCRIPTION OF A SPECIFIC EMBODIMENT

The invention will better be understood when considered in the light of the following description of one embodiment thereof which is made hereafter in conjunction with the drawings in which:

FIG. 1 is an elevational view of a partially broken away lead-acid storage battery plate;

FIG. 2 is a side section view in the direction 2—2 of FIG. 1;

FIG. 3 is an enlarged segment of the side section of FIG. 2 depicting increased electrolyte accessibility to the active material; and FIG. 4 is perspective illustration depicting a continuous process for making plates in accordance with the present invention.

FIG. 1 shows a lead-acid storage battery plate 2 comprising a conductive grid 4 embedded in a leady (i.e. Pb/PbO/PbO$_2$) active material 6. The grid 4 comprises a network of criss-crossing and interconnecting grid wires 8 depending from an upper border 12 which serves to collect the current flowing through the several grid wires and conduct it to a lug 14 for coupling to other plates in the battery. The grid wires 8 define a plurality of openings 10 which contain the bulk of the active material 6. A bottom border 16 may be employed to support the plate 2 in the battery container.

The active material 6 filling the openings 10 between the grid wires 8 is commonly referred to as a "pellet". The utilization efficiency of the active material within any pellet varies with its distance from the nearest grid wire 8. The active material in the center of the pellet, and most remote from the surrounding grid wires, is utilized less efficiently than the active material in the regions of the pellet immediately adjacent or proximate the grid wires 8. Hence in a conventional plate a considerable amount of ineffective active material resides at the center of the opening 10 and nonproductively contributes to the battery's weight. In accordance with the present invention this nonproductive active material is relocated closer to the grid wires and out of the relatively unreactive center zone of the opening. In this regard, a plurality of dimples 18 are impressed into the center of the active material pellet while it is still moist from the grid-pasting operation and such as to displace paste from the center thereof to the sides thereof outboard the center. This reshapes the pellet such that only a thin web 20 of paste remains at the bottom of the dimple in the center of the pellet and annular mounds 21 of paste form outboard the pellet in zones of the plate more proximate the grid wires 8. As a result, not only is the active material moved closer to the grid wires 8 where it can be more efficiently utilized, but electrolyte availability and accessibility to the mounded active material 21 is significantly improved. In this regard, the dimples 18 act as small reservoirs for the electrolyte and increased surface area provides greater accessibility to the mounded active material as illustrated in FIG. 3 by the arrows 22.

FIG. 4 illustrates a process for manufacturing plates in accordance with the invention. two continuous strips of grid stock 24 are joined together at their lugs 14 and pasted in a conventional grid-pasting station 26 (e.g. belt pasting machine). Preferred grid-stock 24 for this application is expanded metal strip such as is produced by the process described in Daniel et al U.S. Pat. No. 3,853,626. The pasting station 26 embeds the grid stock 24 in moist leady active material 6 and controls the thickness A of the pasted plate within defined limits. Downstream of the pasting station 26 the pasted strip is passed between a pair of coacting rollers 28 which have a plurality of nubs or bosses 30 thereon appropriately located on the surfaces of the rollers 28 as to register with the center of the openings 10 in the grid stock 24. In a preferred application of this process, the grid stock 24 will be pasted to a predetermined thickness A which is less than the thickness which would normally be used for an undimpled plate having the same capacity. Thereafter the pasted strip of uniform thickness A has its active material redistributed by the rollers 28 such as to provide a thin web 20 having a thickness B at the center of the pellet and peripheral mounds 21 of relocated paste having a thickness C outboard the dimple 18 and proximate the grid wires 8. The thickness B of the web 20 should be as thin as possible and will normally depend on the composition of the paste. Paste having reinforcing fibers throughout permit the formation of the thinnest webs 20. In any event the web 20 is thinner than the as-pasted thickness A of the strip before dimpling and the thickness C of the mounded paste is correspondingly greater than the as-pasted thickness A. As a general rule, the maximum surface area for the plate can be achieved with dimples where diameters are about one and one/half (1½) times the thickness A of the as-pasted plate, (i.e. the average thickness of the dimpled plate).

While this invention has been disclosed it is not intended to be limited solely thereto, but rather only to the extent set forth in the claims which follow.

The embodiments of the invention in which an exclusive property or privilege is claimed are defined as follows:

1. In a Pb-acid storage battery electrode including a conductive grid supporting the plates active material and a leady active material embedding said grid such as to form a substantially planar plate defined by two principal faces on opposite sides of the plate, the improvement comprising:

said grid comprising a network of crisscrossing interconnected grid wires defining a plurality of interstitial openings between said grid wires for retaining said active material; and a plurality of dimples in, and distributed substantially uniformly across, at least one of said faces, said dimples each being located at the approximate center of a said opening to provide a lesser amount of said active material in the center of said opening remote from the grid wires surrounding said opening than is provided in the regions of said plate outboard said dimple and proximate said surrounding grid wires; whereby a plate having improved active material utilization efficiency and capacity is produced.

2. In a Pb-acid storage battery electrode including a conductive grid supporting the plates active material and a leady active material embedding said grid such as to form a substantially planar plate defined by two principal faces on opposite sides of the plate, the improvement comprising:

said grid comprising a network of crisscrossing interconnected grid wires defining a plurality of interstitial openings between said grid wires for retaining said active material; and a plurality of dimples in, and distributed substantially uniformly across, said faces, said dimples each being located at the approximate center of a said opening and opposite another grid dimple on the opposite face of said plate, said opposing dimples providing a lesser amount of said active material in the center of said opening remote from the grid wires surrounding said opening than is provided in the regions of said plate outboard said opposing dimple and proximate said surrounding grid wires; said dimples having a diameter equal to approximately one and one/half times the average thickness of the dimpled plate; whereby a plate having improved active material utilization efficiency and capacity is produced.

* * * * *

UNITED STATES PATENT AND TRADEMARK OFFICE
CERTIFICATE OF CORRECTION

PATENT NO. : 4,351,891
DATED : September 28, 1982
INVENTOR(S) : Charles P. McCartney, Jr. and Ellis G. Wheadon It is certified that error appears in the above—identified patent and that said Letters Patent is hereby corrected as shown below:

Column 2, line 32, "surffering" should read -- suffering --.

Column 4, line 14, after "disclosed" insert -- primarily in terms of specific embodiments thereof --.

Signed and Sealed this

Twenty-eighth Day of December 1982

[SEAL]

Attest:

GERALD J. MOSSINGHOFF

Attesting Officer

Commissioner of Patents and Trademarks